United States Patent
Löffler et al.

(10) Patent No.: US 11,055,051 B2
(45) Date of Patent: Jul. 6, 2021

(54) DIRECT AND DISCRIMINATE PIXEL FLOW BETWEEN LOGICALLY-GROUPED SOURCE TO SINK BASED ON AN INTERACTION

(71) Applicant: Pxio GmbH, Saarbrucken (DE)

(72) Inventors: Alexander Löffler, Saarbrucken (DE); Luciano Pica, Saarbrucken (DE); Sebastian Wendland, Saarbrucken (DE)

(73) Assignee: Pxio, Saarbrucken (DE)

( * ) Notice: Subject to any disclaimer, the term of this patent is extended or adjusted under 35 U.S.C. 154(b) by 0 days.

(21) Appl. No.: 15/885,139

(22) Filed: Jan. 31, 2018

(65) Prior Publication Data

US 2019/0235821 A1 Aug. 1, 2019

(51) Int. Cl.
*G06F 3/14* (2006.01)
*G09G 5/00* (2006.01)
*G09G 5/14* (2006.01)
*H04N 21/431* (2011.01)

(52) U.S. Cl.
CPC .......... *G06F 3/1446* (2013.01); *G06F 3/1423* (2013.01); *G06F 3/1431* (2013.01);
(Continued)

(58) Field of Classification Search
CPC ................ G06F 3/1446; G06F 3/1454; G09G 2300/026
See application file for complete search history.

(56) References Cited

U.S. PATENT DOCUMENTS

| | | |
|---|---|---|
| 5,490,247 A | 2/1996 | Tung et al. |
| 6,084,553 A | 7/2000 | Walls et al. |
| 6,088,005 A | 7/2000 | Walls et al. |
| 8,289,368 B2 | 10/2012 | Ramet |
| 9,549,011 B2 * | 1/2017 | Wogsberg ............. H04N 7/181 |

(Continued)

OTHER PUBLICATIONS

Fitzgerald P F, "Evaluating alternative display sharing system architectures", Communications for distributed applications and systems,. Chapel Hill, pp. 145-157, Apr. 18, 1991.
(Continued)

*Primary Examiner* — Koosha Sharifi-Tafreshi
(74) *Attorney, Agent, or Firm* — Patent Ventures, LLC

(57) ABSTRACT

Pixel transporting system includes at least one sender device, at least one receiver device, wherein the sender device and receiver device are coupled and configured by the pixel transport system to process a signal from a sender device and transport the processed signal from the sender device to the receiver device, wherein processing of the signal comprises rendering a partial subset or complete set of source pixels based on a mapping of a virtual projection from a source endpoint to a sink endpoint. Optionally, virtual projection is only partially mapped onto the sink and results in only the intersecting subset of source pixels for transport to the sender device. Also, optionally, the virtual projection is completely mapped onto the sink and results in a complete set of source pixels for transport to the sender device. Also, optionally, the system further includes a pixel flow engine, wherein said engine is further comprised of a plurality of layers defining a pixel flow rule specifying for each available source pixel how it is transformed and transported to at least one sink endpoint to be displayed. Also, optionally, pixel flow rule governs how the source pixel is transported among a logical grouping of endpoints depending on an interaction scenario. Also, optionally, interaction scenario includes at least one of an individual, group, or ad-hoc group interactions.

21 Claims, 13 Drawing Sheets

(52) U.S. Cl.
CPC ........... *G06F 3/1454* (2013.01); *G09G 5/003* (2013.01); *G09G 5/14* (2013.01); *H04N 21/431* (2013.01); *G09G 2300/026* (2013.01); *G09G 2340/0407* (2013.01); *G09G 2340/0442* (2013.01); *G09G 2340/14* (2013.01); *G09G 2354/00* (2013.01); *G09G 2370/12* (2013.01); *G09G 2370/20* (2013.01)

(56) References Cited

U.S. PATENT DOCUMENTS

| | | |
|---|---|---|
| 2003/0142037 A1 | 7/2003 | Pinedo et al. |
| 2008/0068290 A1 | 3/2008 | Muklashy et al. |
| 2008/0098402 A1 | 4/2008 | Lee et al. |
| 2008/0109725 A1 | 5/2008 | Lee et al. |
| 2010/0149306 A1 | 6/2010 | Gopal et al. |
| 2014/0009394 A1* | 1/2014 | Lee .................. H04N 5/4403 345/157 |
| 2015/0187333 A1* | 7/2015 | Loeffler ............ G06F 3/1438 345/1.3 |
| 2018/0307455 A1* | 10/2018 | Cerqueira ........... G06F 3/1423 |
| 2019/0180406 A1 | 6/2019 | Yang et al. |

OTHER PUBLICATIONS

Thomas Gutekunst et al.: "A distributed and policy-free general-purpose shared window system", pp. 51-62, Mar. 1, 1995.

* cited by examiner

DIRECT AND DISCRIMINATE PIXEL FLOW BETWEEN LOGICALLY-GROUPED SOURCE TO SINK BASED ON AN INTERACTION

TECHNICAL FIELD

The invention relates to methods and systems for processing pixel inputs across a reconfigurable multi-layered display infrastructure via a pixel flow engine. More particularly, the primary purpose of the disclosure is to enable heterogenous pixel source devices to engage a collaborative display infrastructure over a network, and according to a pixel flow engine based on group interaction rules, render visible pixels onto a sink endpoint with direct endpoint to endpoint pixel flow, optimizing scalability, low latency, and high pixel density.

BACKGROUND

While there are a number of online/on-site meeting applications in the market that allow for group, collaborative sessions over a network, they generally limit cross-interaction between users and do not allow for direct and discriminate endpoint to endpoint pixel transport. They do not account for the global state of the pixel transmission during pixel flow between pixel source endpoints (sources) and sink endpoints (sinks). Extant solutions for pixel transmission comprise communication mediums which rely on intermediary endpoints for relaying pixel flow from source to sink; lacking a direct pixel flow solution which only transport those pixels that display, resulting in a direct pixel flow between the source and all involved sinks. Additionally, extant solutions lack a controller to manage pixel flow decisions autonomously based on logical groupings of endpoints depending on the group scenario. Currently, state-of-the-art video transport solutions typically implement only one-to-one connections (source-intermediary point-sink) between exactly two peers without having an idea of a global state of video transport involving more than just the two peers. If a source signal is split and re-merged at any point during the processing on its way to one or more sinks, there is no knowledge of the global state at the involved endpoints, but only about every one-to-one connection on the way. For instance, if a video signal from a source in "HD" resolution (1920×1080 pixels) is to be shown spanned across a display wall of four (2×2) screens as sinks using HDMI cables as a communication medium and an HDMI splitter in-between, the source assumes it is communicating with an HD sink as the opposite endpoint (the splitter), while each of the sink displays assumes it shows content from a quarter-HD—i.e. 960×540 pixel source (again the splitter) with all endpoints having no knowledge of the global state of the pixel transport.

SUMMARY

The present invention fills a void left behind by the currently existing pixel transmission solutions and references. The present invention provides for a system and method for direct and discriminate source to sink pixel flow based on interaction scenarios. Direct implying pixel flow between source endpoint and sink endpoint without intermediary points. Discriminate implying that only those pixels that are visible on the sink device will end up being transported from the source device. The system and method provided are for an autonomous pixel flow display infrastructure, governing direct and discriminate endpoint to endpoint pixel flow in a variety of interaction scenarios. Direct and discriminate source to sink pixel flow; autonomously governed by individual, group, and, or ad-hoc group interactions. Governed by a distributed remote and client device system—the pixel flow engine—which comprises a user layer, administrative layer, application layer, and protocol layer interact to inform a pixel flow rule. The pixel flow rule in turn governs the flow of pixels and the characteristics of pixel flow between logically grouped endpoints derived from any number of individual, group, and, or ad-hoc group interactions. The system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a processor, cause the system to perform the following routines for pixel transmission.

It is an object of the invention to disclose an embodiment that includes at least one processing unit coupled to a memory element, and having instructions encoded thereon, configured to: over a network, collect at least one user endpoint data, from at least one of source endpoint and sink endpoint. The disclosed embodiment is configured to trigger an action based on the at least one user endpoint data. According to an embodiment, the triggered action enables a source endpoint to be projected onto a sink endpoint resulting in pixel transport of only visible pixels to the respective sink endpoint. Preferably, each user has full access to all endpoints owned through the infrastructure, transporting pixels from owned source to owned sinks, wherein user ownership implies singular control over its resources and permissions to transport or receive pixels. According to an embodiment, if a projection to be physically mapped onto a sink endpoint only partially intersects with the sink endpoint, then the system is configured to only transport those pixels that intersect and not the entire set of source pixels, resulting in a direct pixel flow from source to sink of only those pixels that are visible.

Moreover, the invention described herein may be used as a universal platform across a plurality of industries that may take advantage of a display-based, group-aware application, including, but not limited to, healthcare, education, hospitality, legal, television, film, fashion, general contractor, general practitioners, live event, workflow, security, design, information technology, accounting, marketing, real estate and sales. These and other features and improvements of the present application will become apparent to one of ordinary skill in the art upon review of the following detailed description when taken in conjunction with the several drawings.

DETAILED DESCRIPTION OF DRAWINGS

Figure 1A:
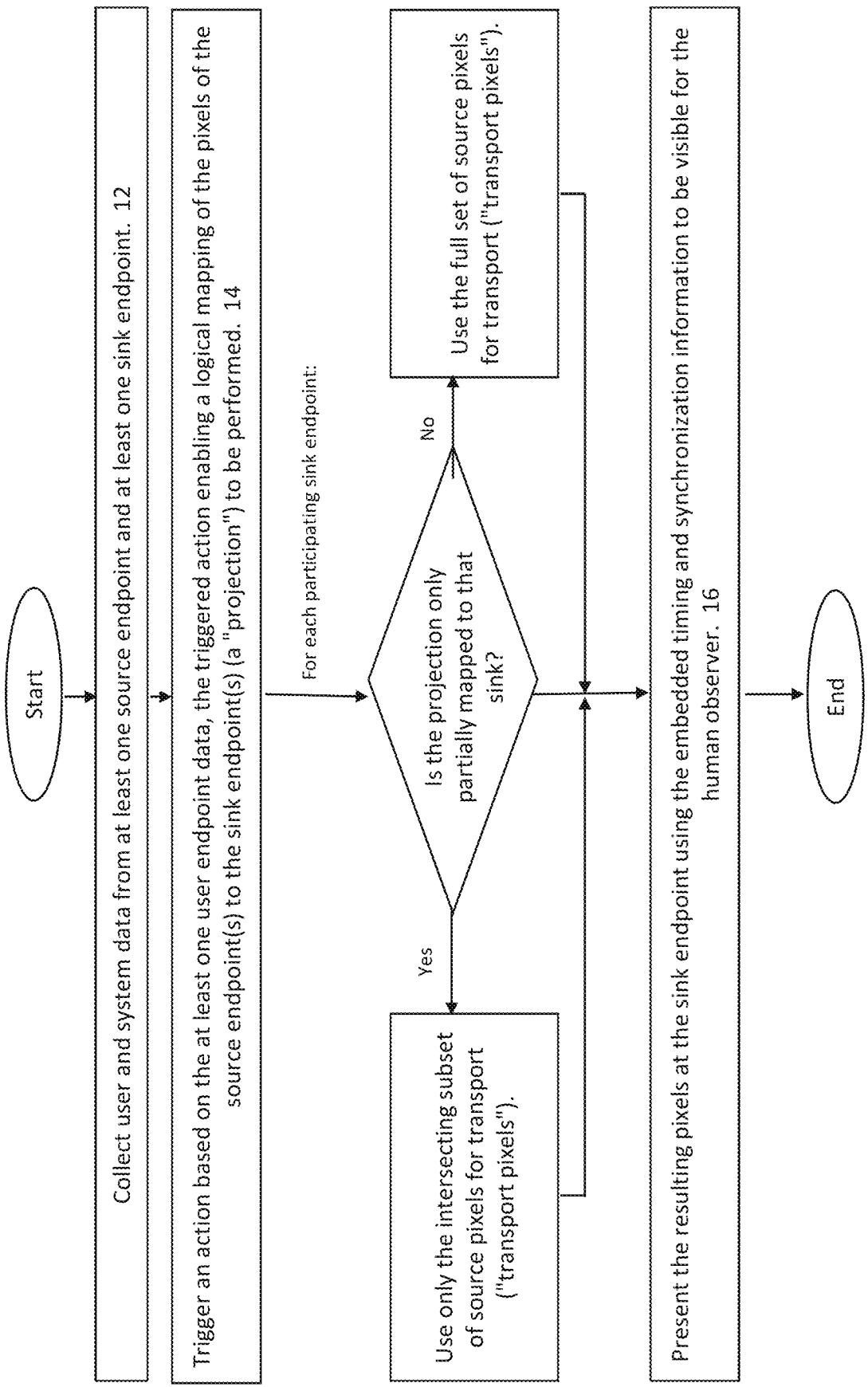
FIG. 1A illustrates an exemplary pixel flow process in which various embodiments of the disclosure can be practiced.

The present invention will now be described more fully with reference to the accompanying drawings, in which embodiments of the invention are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Overview: Multi-Point User-Centric Display Infrastructure

The primary purpose of the disclosure is to provide for a system and method for direct and discriminate source to sink pixel flow based on interaction scenarios. The system and method provided are for an autonomous pixel flow display infrastructure, governing direct and discriminate endpoint to endpoint pixel flow in a variety of scenarios: individual, group, and, or ad-hoc group interactions. The flow of pixels and the characteristics of pixel flow between logically grouped endpoints derived from any number of individual, group, and, or ad-hoc group interactions. The invention is a system that provides true multi-point video transport capabilities from one pixel source to multiple pixel sinks, from multiple sources to one sink, or any combination of multiple sources to multiple sinks using a pixel flow engine as a common communication medium. Overall, the goal is to locally adapt the pixel flow in order to globally optimize the viewing experience for all observers. As pixels always flow peer-to-peer (i.e., from a source to one or more sinks), each participating one-to-one stream is treated and optimized separately, however based on knowledge of the global system state. Conditions are automatically reevaluated whenever the system changes enough that a decision does not apply anymore. This allows the system to autonomously adapt to changes, as well as to system errors (e.g., failed display) and/or external events. The pixel flow engine is comprised of multiple layers, each layer defining its own set of rules, which in combination define the final pixel flow rule. Pixel flow rules specify for each available source pixel in the infrastructure how it is transformed and transported to specified destinations to be displayed—resulting in optimized pixel flow.

In a preferred embodiment, a system may comprise of at least one sender device and at least one receiver device coupled and configured to: over a network, process a signal from the sender device and transport the processed signal from the sender device to the receiver device, wherein processing of the signal comprises rendering a partial subset or complete set of source pixels based on a mapping of a virtual projection from a source endpoint to a sink endpoint. If the projection is only partially mapped onto the sink, then use only the intersecting subset of source pixels for transport to the sender device. In instances where the projection is fully mapped onto the sink, then the complete set of source pixels is transported to the sender device.

In another embodiment, a system may comprise of at least one sender device, at least one receiver device, and a pixel flow engine, wherein the pixel flow engine, over a network, enables processing of a signal from the sender device and transport the processed signal from the sender device to the receiver device, wherein processing of the signal comprises rendering a partial subset or complete set of source pixels based on a mapping of a virtual projection from a source endpoint to a sink endpoint. If the projection is only partially mapped onto the sink, then use only the intersecting subset of source pixels for transport to the sender device. In instances where the projection is fully mapped onto the sink, then the complete set of source pixels is transported to the sender device. In another embodiment, the system may, additionally, govern the flow of pixels and the characteristics of pixel flow between logically grouped endpoints or devices derived from any number of individual, group, and, or ad-hoc group interactions.

In a preferred embodiment, a display infrastructure system may comprise: at least one sink endpoint; at least one source endpoint; a pixel flow engine further comprising at least one of an administrative layer, protocol layer, and application layer that interact to generate a pixel flow rule. The system is configured to: obtain data from the sink endpoint, source endpoint and pixel flow rule to generate a permission check on the administrative layer to connect endpoints for pixel flow, whereby if permission is granted, endpoints are connected via the protocol layer to enable the direct flow of pixels from a source endpoint to a sink endpoint via the application layer. In another embodiment, the system is configured to: obtain data from the sink endpoint, source endpoint and pixel flow rule to generate a permission check on the administrative layer to connect endpoints for pixel flow, whereby if permission is granted, endpoints are connected via the protocol layer to enable the direct flow of pixels from a source endpoint to a sink endpoint via the application layer. Furthermore, the flow of pixels is rendered as a partial subset or complete set of source pixels based on a mapping of a virtual projection from a source endpoint to a sink endpoint, resulting in a direct flow of only visible pixels from a source endpoint to a permission-granted and connected sink endpoint.

FIG. 1a illustrates a process flow of an exemplary system in accordance with an aspect of the invention. In a preferred embodiment, a system with at least one processing unit coupled to a memory element, and having instructions encoded thereon, may be configured to: over a network, collect user and system data from at least one of source endpoint and sink endpoint 12. The disclosed embodiment is configured to trigger an action based on the at least one user endpoint data. According to an embodiment, the triggered action enables a virtual mapping of pixels of the source endpoint to the sink endpoint to be performed (projection) 14. If the projection is only partially mapped to the sink, then use only the intersecting subset of source pixels for direct transport from source to sink. Optionally, present the resulting pixels at the sink endpoint using the embedded timing and synchronization information to be visible for the human observer 16. Preferably, each user has full access to all endpoints owned through the infrastructure, transporting pixels from owned source to owned display, wherein user ownership implies singular control over its resources and permissions to transport or receive pixels. Alternatively, if the projection to be physically mapped onto a sink endpoint completely overlaps or intersects the sink endpoint, then the system is configured to transport the entire set of source pixels.

Figure 1B:
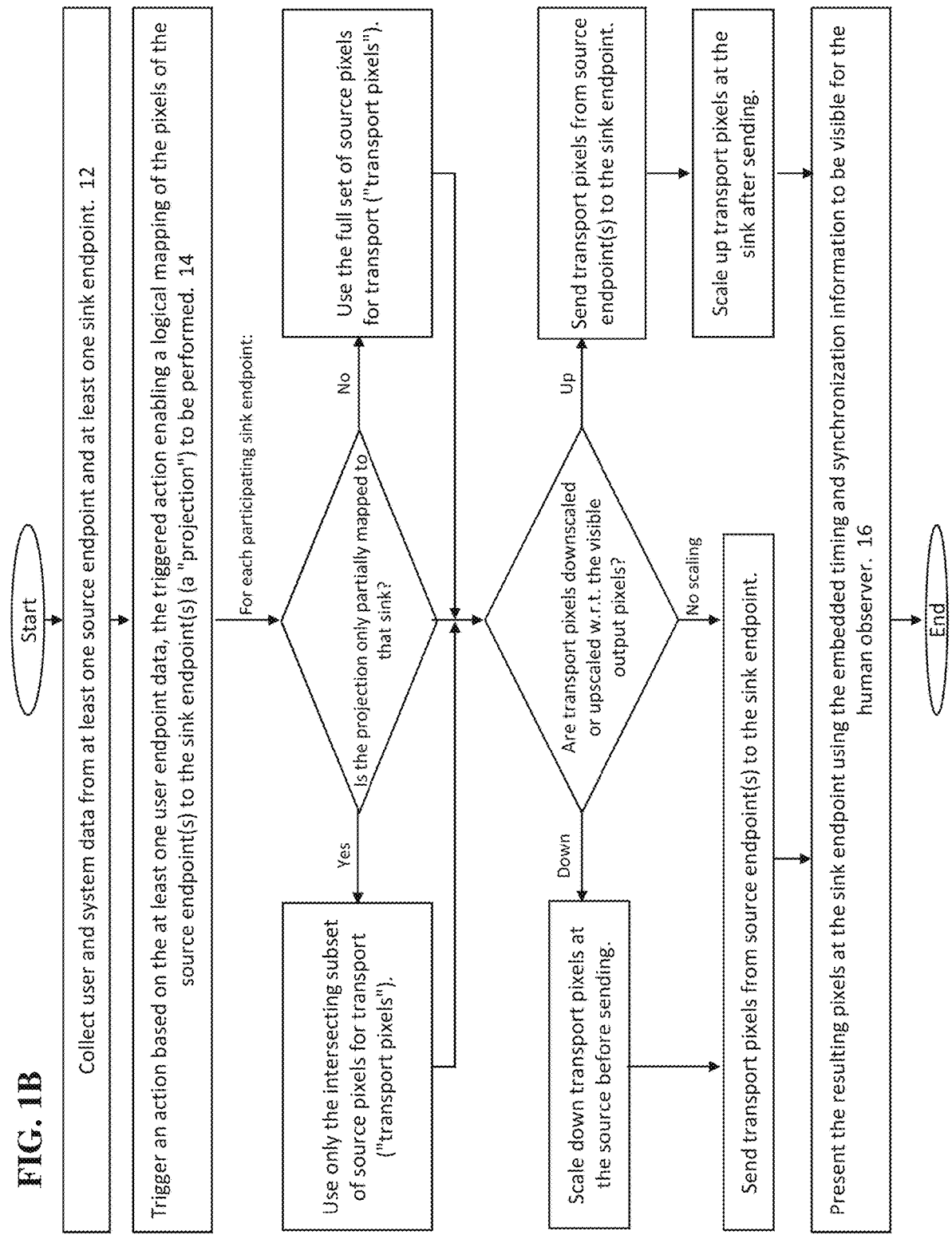
FIG. 1B illustrates an exemplary pixel flow process in which various embodiments of the disclosure can be practiced.

As shown in FIG. 1b, the processing of the signal at the source endpoint, sink endpoint or sender device, receiver device may entail downscaling or upscaling the source pixels or transported pixels. If the source pixels require downscaling as a function of the visible output pixels, the system may scale down the transport pixels at the source before sending. Alternatively, if upscaling is required, the system may send the transported pixels from source endpoint to the sink endpoint and scale up the transport pixels at the sink after sending.

Figure 2:
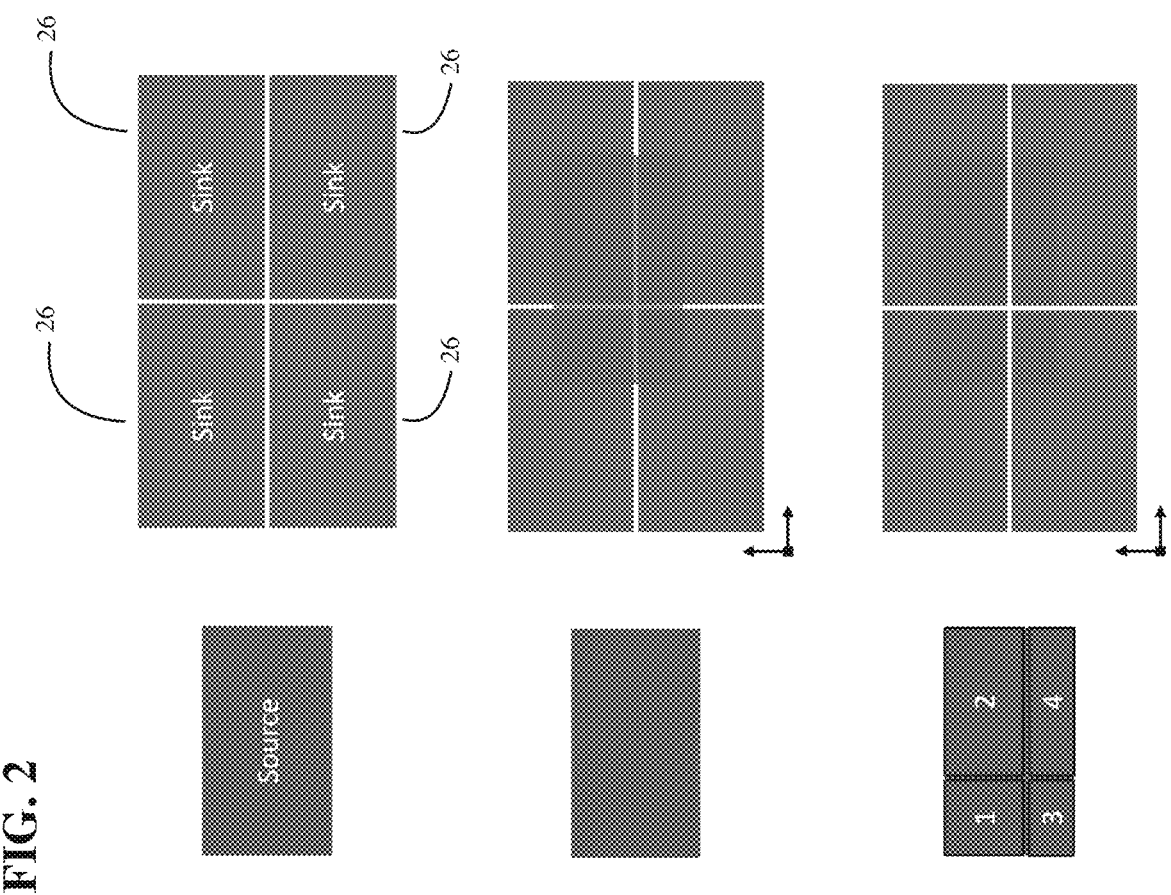
FIG. 2 illustrates a schematic of the direct and discriminate pixel flow from source endpoint to sink endpoint, in accordance with an aspect of the invention.

FIG. 2 illustrates a schematic of this discriminate pixel mapping from source to sink based on sink display parameters or characteristics and source projections, resulting in optimal pixel flow and computing efficiencies. As shown in FIG. 2, this particular embodiment suggests one source endpoint coupled to four sink endpoints 26, forming a consecutive video wall. It should be noted that any number of source endpoints and sink endpoints may be coupled or logically grouped. FIG. 2 illustrates the projection to be physically mapped into the coordinate system of the sink endpoint 26. As FIG. 2 illustrates, in this particular embodiment, the projection may only partially intersect with the sink endpoint 26, hence the system may be configured to only transport those pixels that intersect and that will be visible on the sink 26. Scaling and temporal aspects of the transport/transported pixels are disregarded for purposes of illustration.

It is another object of the invention to disclose layers of middleware or software within a pixel flow engine that interact to inform a pixel flow rule governing the direct and discriminate pixel flow between source and sink endpoints. In an embodiment, the pixel flow engine is a distributed system with its functionality dispersed across a remote server and local client devices. The pixel flow engine is configured to trigger an action based on the at least one user endpoint data. According to an embodiment, the triggered action enables a source endpoint to be projected onto a sink endpoint resulting in pixel transport of only visible pixels to the respective sink endpoint. Preferably, if a projection to be physically mapped onto a sink endpoint only partially intersects with the sink endpoint, then the system may be configured to only transport those pixels that intersect and not the entire set of source pixels, resulting in a direct pixel flow from source to sink of only those pixels that are visible.

Exemplary Pixel Transport Network Environment

Figure 3:
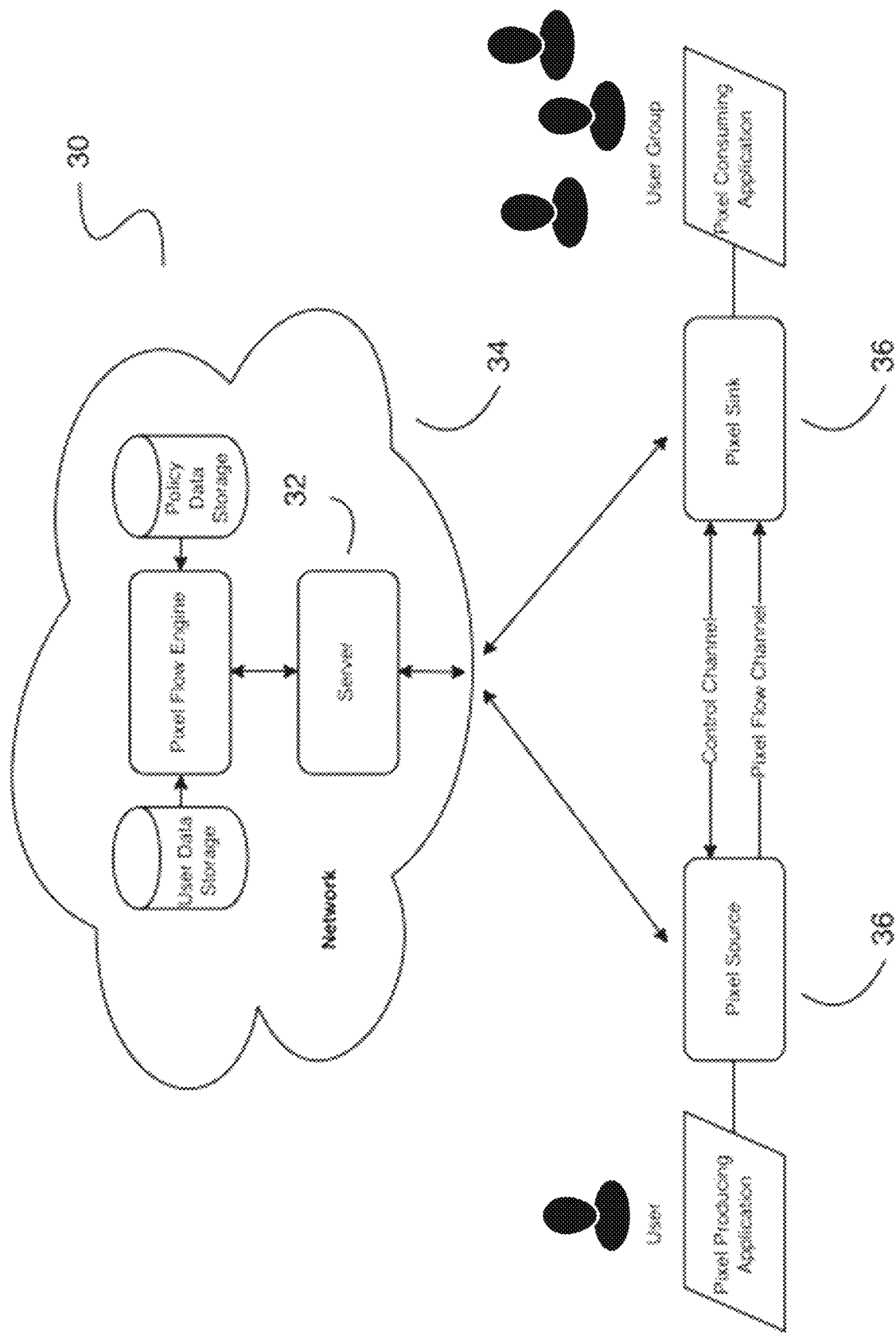
FIG. 3 shows various components of an exemplary network, according to an embodiment of the disclosure.

FIG. 3 illustrates an exemplary pixel transmission protocol network environment 30 in which various embodiments of the present invention can be practiced. The environment 30 includes a user, groups of users, or various groups of users (not shown) with a source/sink device 36, which is communicatively coupled to the server 32, and more specifically, the pixel flow engine, over a network 34. The pixel flow engine is extended with user data storage and policy data storage. As shown, the source/sink device 36 refers to any electronic device which is capable of sending, receiving and processing visual information. Examples of the source/sink device 36 include, but are not limited to, a smartphone, a mobile device/phone, a Personal Digital Assistant (PDA), a computer, a workstation, a notebook, a mainframe computer, a laptop, a tablet, a smart watch, an internet appliance, a display wall, a display wall comprised of a plurality of displays, a plurality of physically remote displays communicatively coupled, and any equivalent device capable of processing, sending and receiving visual data via a pixel flow. The user, group of users, or various groups of users (not shown) may use the source/sink device 36 for his day-to-day tasks such as emails, internet surfing, presentations, office applications, social networking, virtual conferencing, or the like depicted as pixel producing and pixel consuming applications. In the context of the present invention, the user, group of users, or various group of users may use the computing device for collaborating with at least one other user for purposes of co-interfacing across applications, browsers, and tools to create workflow or group-flow efficiencies. Various examples of interaction may be group collaborating, remote group collaborating, spontaneous collaboration, information sharing, customer interaction, context-aware session, etc.

In continuing reference to the network depicted in FIG. 3, the network 34 may be any other type of network that is capable of transmitting or receiving data to/from/between source/sink devices 36: computers, personal devices, smart phones, displays, display walls, or any other electronic devices. Moreover, the network 34 may be any suitable wired network, wireless network, a combination of these or any other conventional network, including any one of, or combination of a LAN or wireless LAN connection, an Internet connection, a point-to-point connection, or another network connection—either local, regional, or global. As such, the network may be further configured with a hub, router, node, and, or gateway to serve as a transit point or bridge to pass data between any of the at least networks. The network 34 may include any software, hardware, or computer applications that implement a communication protocol (wide or short) or facilitate the exchange of data in any of the formats known in any art, at any time. In some embodiments, any one of a hub, router, node, and, or gateway may additionally be configured for receiving wearable or IoT data of a member of a group session. Such data may be saved, shared, or mapped onto larger displays for group viewing of deeper contextualized data, which may further inform the suggestion tool layer or automation tool layer for more enhanced proactive workflow or group-flow.

In continuing reference to FIG. 3, while pixel input is not handled by the server at all, user (interaction) input might be handled on the server, but might also be peer-to-peer. On the other hand, pixel flow rule input is handled partially by the server, partially by sources and sinks. The network-coupled server 32, cloud-based server 32 may be capable of providing a data storage, computing, communicating and searching. A schematic of pixel flow with reference to a server 32 and client sources 36/client sinks 36, pixels never flow through the server 32, but always peer-to-peer between client devices (source 36 to sink 36). Pixel flow rules, while possibly defined/decided by the server having global knowledge, are always executed by the endpoint clients and their local knowledge.

Preferred embodiments may include the addition of a remote server 32 or cloud server 32 to further provide for back-end functionality and support. The server 32 may be situated adjacent or remotely from the system 30 and connected to each system 30 via a communication network 34. In one embodiment, the server 32 may be used to support context-aware sessions; user behavior profiling; user history function; predictive learning/analytics; alert function; network sharing function; digital footprint tracking; e-commerce/advertising platform support, etc.

The remote server 32 may be further configured to authenticate the user and retrieve data of the user, device or network and applies the data against a library of validated user information. In some embodiments, device input may encompass the sensor-captured raw data input or transduced and processed data input from any other device associated with the user, such as devices worn, mobile devices or fixed-access devices, such as Internet-of-Things devices (e.g. smart thermostat, home automation consoles, conference room consoles, etc.). The sensor captured data may capture at least one of a user environmental or contextual data to further inform a user mood, emotion, physical condition, or mental well-being to further enhance or inform a group display session. The convergence of device inputs provide additional input for layering the behavior profile with additional context for generating a higher fidelity of user mood, emotion, well-being, etc. This higher resolution may update the pixel flow engine, pixel flow layers, pixel flow rules or policy for optimizing the pixel flow from source to sink end-points.

Figure 4:
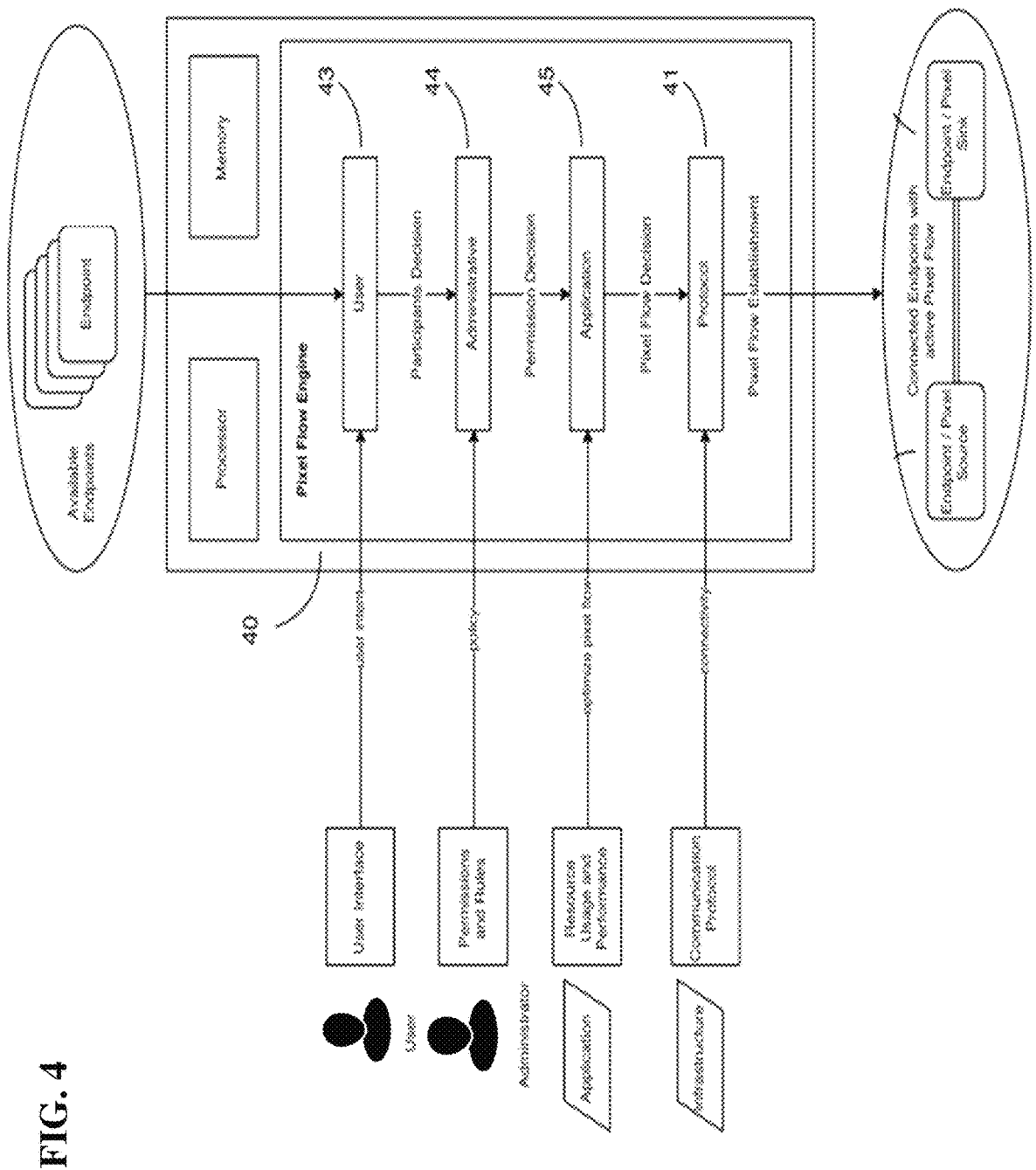
FIG. 4 shows various components of an exemplary system, according to an embodiment of the disclosure.

Exemplary Pixel Flow Engine:

FIG. 4 is a system diagram illustrating various components of an exemplary pixel flow engine 40, according to an embodiment of the disclosure. In a preferred embodiment, a system for source-to-sink pixel flow for intrinsic or grouped user interaction may comprise a pixel source; a pixel sink; a pixel flow engine 40; at least one processor; a non-transitory storage element coupled to the at least one processor; encoded instructions stored in the non-transitory storage element, wherein the encoded instructions when implemented by the processor, configure the system or pixel flow engine 40 to: over a network, receive data for at least one of a pixel source, pixel sink device to inform a pixel flow rule, said pixel flow rule to cause any one of, or combination of, control—synchronization, coordination, or calibration—of pixel source from at least one endpoint to at least one pixel sink at a different end-point based on the received data; and transport the controlled pixel source to the available individual sink device for at least one of viewing, sharing, and, or interacting with, among any number of endpoints, users, and interaction scenarios, wherein only visible pixels at a sink device are mapped from the source and a global data state of the pixel flow from the source and sink is preserved. Both pixel sinks and pixel sources are considered endpoints in the system. The pixel flow engine 40 selects appropriate endpoints from all available endpoints to connect a number of endpoints to establish active pixel flow.

Further yet, in an embodiment of the invention, the pixel flow engine 40 comprises of a user layer 43, administrative layer 44, application layer 45, protocol layer 41. The system is configured to accept input at a centralized, dedicated entry point; evaluate the input from a higher abstraction layer to a lower layer; optionally, apply a pixel flow rule for governing a pixel flow from source to sink end-point by a pixel flow manager 42. As schematized by FIG. 3, pixels never flow through the server 32, but always peer-to-peer between client devices (source 36 to sink 36). Pixel flow rules, while possibly defined/decided by the server having global knowledge, are always executed by the endpoint clients and their local knowledge. With respect to the specific layers, the pixel flow engine checks permissions on the administration layer; connects end-points on the protocol layer; and enables pixel flow on the application layer for optimizing pixel flow from a source display to a sink display for ideal group display outcomes. In continuing reference to FIG. 4, the pixel flow engine checks permissions on the administration layer 44; connects end-points on the protocol layer 41; and enables pixel flow on the application layer 45 for optimizing pixel flow from a source display to a sink device for ideal group display outcomes.

Pixel Flow Engine Layers

| Pixel Flow Engine Layers | | | |
| --- | --- | --- | --- |
| User | Intention | Show me my laptop | UX/UI |
| Administrative | Policy | Allows users to share their group Give access to room infrastructure | Pxio Cloud |
| Application | Resource | Optimize pixel flow | API's (VFB/VD) |
| Protocol | Communication | Connect endpoints | Communication |

The protocol layer 41 specifies the communication protocol and its main concern is establishing and controlling all communication channels between endpoints. The protocol layer 41 specifies how all endpoints (pixel sources and displays) connect and report to a central controller component (pixel manager), which gathers information about all endpoints and makes those available as the infrastructure. Elementary rules are specified by the protocol layer 41 and defines basic network connectivity, pixel formats and transport mechanisms, basically how to get a set of pixels from one endpoint to another. Projections are used to specify how source pixels are mapped onto display pixels and the protocol layer 41 governs all communication channels to enable this basic pixel flow.

The administrative layer 44 uses the controller component (pixel flow manager) of the protocol layer 41 to enforce permissions and define the logical infrastructure. This provides a central access-point to define and control all infrastructure endpoints. Policies can be defined by an administrator. The main concern of the administrative layer 44 is defining and enforcing infrastructure usage policies. Logical groups can be built from either end-points (e.g., infrastructure in a certain room, or for a special purpose) or users as groups for sharing purposes. The administrative layer 44 governs how the overall infrastructure can be used by logically grouping endpoints or users and enforcing permissions. Logical endpoint groupings combine a multitude of endpoints into a higher-level concept, e.g. a display wall consisting of multiple pixel sinks or a visualization center consisting of a multitude of separate displays, display walls and sources. Users can be logically combined in groups to specify certain relations between users.

The application layer 45 is the boundary between both pixel producing and pixel consuming applications on the one hand and the core components implementing the protocol on the other hand. Its main concern is efficient resource usage by optimizing pixel flow to save both computing performance and network bandwidth. On the application layer 45 pixels are either written into a pixel source or displayed at a pixel sink, which both are endpoints in the infrastructure. Special applications can also provide both pixel source and sink functionality, e.g. to provide proxy capabilities by receiving pixels from multiple sources, combining them and re-offering the combined pixels as another source. All endpoints can transform input or output pixels to optimize pixel flow regarding computing performance and network bandwidth requirements.

The user layer provides access to the infrastructure for all end users via a set of user interfaces, which range from specialized graphical interfaces for certain purposes, gesture-based, or voice-controlled interactions based on a current context (e.g. location, group, time) to completely automated systems which monitor the infrastructure for certain conditions to trigger corresponding actions. A basic pixel flow rule on the user layer is ownership: each endpoint belongs to a certain user who can use it freely. Endpoints can also be shared with other users or groups by users themselves. All available endpoints—be it via direct ownership or sharing—can be used by a user via intentions. Intentions specify what a user wants to accomplish and how the infrastructure must check permissions and availability at the administrative layer 44 and connect endpoints on the protocol layer 41 to enable pixel flow on the application layer 45. Incidentally, layers do not need to impose any pixel flow rules, e.g. an infrastructure without user or administrative layers can be used to arbitrarily map pixel sources and sinks onto each other by anyone, only the protocol layer connectivity and application layer optimization would be used in this case.

Exemplary Pixel Flow Logic:

In a preferred embodiment, a system for source-to-sink pixel flow for intrinsic or grouped user interaction may comprise a pixel source; a pixel sink; a pixel flow engine; at least one processor; a non-transitory storage element coupled to the at least one processor; encoded instructions stored in the non-transitory storage element, wherein the encoded instructions when implemented by the processor, configure the system or pixel flow engine to define a pixel flow rule for governing pixel flow by: communicating infrastructure defining information, such as basic network connectivity, pixel formats and transport mechanisms to a pixel flow manager within a protocol layer; informing an administrative layer in enforcing permissions or usage policies for logically grouping end-points in the infrastructure from the communicated information to the pixel flow manager; implementing the communicated information to enable a pixel flow to an available sink device for at least one of viewing, sharing, and, or interacting with, by an application layer; wherein a global data state of the pixel flow from a source end-point to a sink end-point is maintained and only viewable pixels are mapped onto the sink device.

In other embodiments, the pixel flow engine may further comprise a user layer, which provides access to the infrastructure for all end users via a set of user interfaces, which range from specialized graphical interfaces for certain purposes, gesture-based, or voice-controlled interactions based on a current context. In yet other embodiments, layers do not need to impose any pixel flow rules, e.g. an infrastructure without user or administrative layers can be used to arbitrarily map pixel sources and sinks onto each other by anyone, only the protocol layer connectivity and application layer optimization would be used in this case.

Exemplary Conditions Underlying Flow Logic

Protocol Layer Conditions

In most cases a direct connection between endpoints is required for the pixel flow. In special cases, intermediary connectors like proxies can be used to connect otherwise unreachable endpoints. The critical decision for the protocol layer is to determine: whether all necessary entities to fulfill a user request be connected to each other either directly or via indirect means. How to notify the user if not reachable within the infrastructure. Can two endpoints understand each other. Endpoints must use the same protocol version or at least compatible versions.

Application Layer Conditions

The coordinates of a projection (mapping of a pixel source to one or more displays) are measured in real-world units within the scope of a common coordinate origin. Within that origin, also one or more displays may be located, all of which are configured with their visible screen surface. Using the size and resolution properties of those displays, the system can deduce the exact position of every pixel on every display within the origin in real-world units. This works for both homogeneous displays as well as arbitrary combinations of different displays. A projection into the origin thus may or may not cover individual pixels of the displays located in said origin, resulting in those displays showing a segment of the source stream or not. In general, send only those pixels from a source to a display, which cover the pixels of a display within the origin. That is, if the projection intersects with a display only partially, send only the intersecting part instead of the entire set of source pixels.

While the number of available pixels for display is obviously decided by each pixel source (input size), the number of transported pixels depends on the size of the (sub-)projection on each participating display (output size). Goal of the transport strategy is optionally to never send more pixels to a single display than it ultimately displays towards the observer. Minification: If the output size of a (sub-)projection is smaller than its input size, scale down at the source and send pixels in output size. Magnification: If the output size of a (sub-)projection is larger than its input size, send pixels in input size and scale up at the display. Interpolation: If the output size of a (sub-)projection is identical to its input size, but their pixel coordinates do not match (e.g., the input pixels are placed a half inter-pixel distance off the output pixels), still send the original pixels and interpolate between multiple pixels at the display.

If parts of multiple projections cover the same area (in terms of x/y coordinates) within the same origin, their z coordinate (depth layering) decides the ultimately front most projection and, thus, on pixels to be presented on each affected display. If a (sub-)projection A is anything but topmost on an affected display, send only the visible pixels. This can result in anything between: sending no pixels at all (if A is completely covered by other projections), subdividing A in even smaller visible rectangles and sending those (if partially covered by other projections), and still sending all pixels (if A is not topmost in terms of z-order, but also not intersecting with other projections).

Any host device running system endpoints is at some point limited in terms of performance if adding more pixels to be processed there—e.g., by increasing the resolution of a source or increasing the number of sources projected on a display. Even with making use of hardware acceleration and all (other) system optimizations in place, distributing workload across multiple pixel streams is less performant as doing the same in just one stream. This means, if you compare processing one given pixel stream with processing two streams with exactly half the number of pixels each, the device typically requires more performance to do the latter, you just can try to keep that overhead as small as possible. This in turn implies that you can reach the performance limits of any device with some projection scenario, resulting in a degraded viewing experience, which requires additional mechanisms to cope with the situation.

If it is known that a source-sided device will be unable to process a larger number of outgoing streams, offload the subdivision into streams per display to an external proxy device, which is fed by just one stream from the performance-limited source in maximum needed quality and then performs the job of subdividing and re-encoding that stream further and sending it to the ultimate display receivers. If it is known that a display-sided device will be unable to process any further incoming streams upon initiating a new projection onto that display, offload the compositing of the multiple streams to a different proxy device and send just one composited stream to the performance-limited display. The proxy device can be discovered dynamically within the local network of available and more powerful clients and performs the same operations as if it were a display itself, just, instead of presenting the result on a screen, it sends it as a new pixel stream to the performance-limited device and screen.

Administrative Layer Conditions

The administrative layer governs how the overall infrastructure can be used by logically grouping endpoints or users and enforcing permissions. Logical endpoint groupings combine a multitude of endpoints into a higher-level concept, e.g. a display wall consisting of multiple pixel sinks or a visualization center consisting of a multitude of separate displays, display walls and sources. Users can be logically combined in groups, to specify certain relations between users, e.g. administrative users with elevated permissions, static groups representing company organizational structure or dynamic groups for a short-term meeting. Access to all endpoints or combinations thereof can be limited via permissions, e.g. which user or group can use each endpoint.

Permissions control who can access which endpoints and how they can be used with each other. Decisions based on this condition: Does the user have ownership of this entity? Does the user have permission to use another user's entity in the requested way? Users can freely share endpoints with other users or groups of users. The full extent of who will be able to use a shared endpoint might not be immediately obvious. Therefore, users might be warned before sharing with a broader range of or unknown recipients. Decisions based on this condition: Should possibly sensitive content be shared with a broader range of recipients or unknown recipients?

Pixels shown via the infrastructure might contain sensitive content, e.g. during a board meeting. Such endpoints can be flagged specifically and only be used on specially secured parts of the infrastructure. Decisions based on this condition: Is the display location secure enough for sensitive content? Can outsiders see displays? Are guests attending? Endpoints or parts of the infrastructure can be booked in advanced or be currently blocked by exclusive usage. In such cases the infrastructure might provide alternatives. Decisions based on this condition: Is a certain display or room available? Will it be available long enough or is it scheduled for other use soon? Are there available alternatives if not?

Special use cases might require specific capabilities of involved endpoints, e.g. high-resolution, a minimum number of displays or a certain total display area. Decisions based on this condition: Is a meeting room required or is any available nearby display sufficient? Is the available infrastructure sufficient for the required outcome? Are specific capabilities required? The usage of endpoints might be subject of usage fees of some kind. This might take the form of internal accounting, where the costs for an endpoint (hardware, software/license, support, running costs) is charged to individual departments based on actual usage, or a flat usage fee the owner of the endpoint might charge the users (i.e. a hotel charging their guests a fee for using installed display endpoints). Decisions based on this condition: If the endpoint charge a fee, and if the user has a budget and/or enough credit, charge the user and credit the endpoint owner.

User Layer Conditions

A basic pixel flow rule on the user layer is ownership: each endpoint belongs to a certain user who can use it freely. Endpoints can also be shared with other users or groups by users themselves. All available endpoints—be it via direct ownership or sharing—can be used by a user via intentions. Intentions specify what a user wants to accomplish and how the infrastructure must check permissions and availability at the administrative layer and connect endpoints on the protocol layer to enable pixel flow on the application layer.

A major feature of our user-centric system is targeting pixel output towards a specific user ("Show my desktop to Bob."). This functionality is able to build on arbitrary mechanisms for actually locating the user in the building and is independent of the concrete mechanism updating that location information in the system.

If the location of a user is known to the system (this information may originate from e.g. Bluetooth beacons, QR codes scanned by a mobile, or simple room reservations), pixels are sent to a suitable display in her vicinity. To determine the most suitable display, all running display applications are taken into account that are (a) accessible to that user (i.e., running on either her own endpoint or a group-accessible endpoint) and (b) configured with their coordinate origins to be in the same room as the user. Among those suitable displays, the system uses the user's preferences (prefer mobiles, use largest display area, . . . ). If in doubt or no display is currently running close by, the system asks the user via notification.

Time (Correlation)

Both absolute time as well as relative time between events can be used to control pixel flow. Decisions based on this condition: start/stop endpoints at a given time; repeat decisions at regular times; sink endpoints started in close spatial proximity and in close succession to each other can be used to deduce the intent of using them together as a larger, consecutive display surface.

User Habits

If a user in the past has habitually performed a mapping of pixels in a certain way (e.g., projected mobile content onto the right of two screens in a meeting room on Wednesday mornings), the system learns and may use the information to simplify the system usage in the future. Decisions based on this condition: If a certain projection between a source and sink app accessible by the same user has taken place at least twice, add this projection to a set of preferred projections for that user. If enabled in that user's preferences, the system can carry out that projection automatically based on certain time constraints, when endpoints come online, or other trigger conditions.

Context

Depending on the surrounding context user interaction can be simplified by relating intentions to this context. Decisions can be deduced from the surrounding context: current location; relative directions (left, right); last entity the user interacted with; available entities; free pixel display area.

Layout/Visibility/Focus

The infrastructure can automatically optimize available display space if multiple sources are shown at the same time. Decisions based on this condition: optimize display space usage for visibility when showing multiple sources. To provide a better user experience the system detects which endpoint a user focuses on or call the user's attention to one if necessary. Decisions based on this condition: focus on projection currently interacted with and prioritize the pixel transport there in all aspects; request user attention on specific projection.

Fallback Adaptations

All of the above adaptations are quality-retaining and make the experience better for an observer without having to trade off anything. If however, after all the potential optimizations above, a desired projection would not be possible at all given the current set of hosts and apps running the system, the system starts to adapt (up to a certain level) in a quality-reducing way and trades off video transport quality for frame rate or UI smoothness. A classic situation where fallback adaptation apply are bandwidth limitations in the IP network as the overall transport medium. Possible adaptations in such cases include:

Resolution: Lowering the resolution (i.e., x/y size in pixels) of the pixel stream take off strain from both the source and display ends of the system.

Encoding bitrate: A higher encoding bitrate (i.e., less compression) allows to relieve strain from especially source endpoints performing the encoding. This however results in higher network bandwidth requirements and, if bandwidth is too high, can lead to data I/O problems at both ends. A lowering of the encoding bitrate however increases strain on (primarily) the source-sided endpoint device in favor of freeing up a part of the network bandwidth.

Exemplary Group Interactions/Pixel Flow Outcomes

Figure 5:
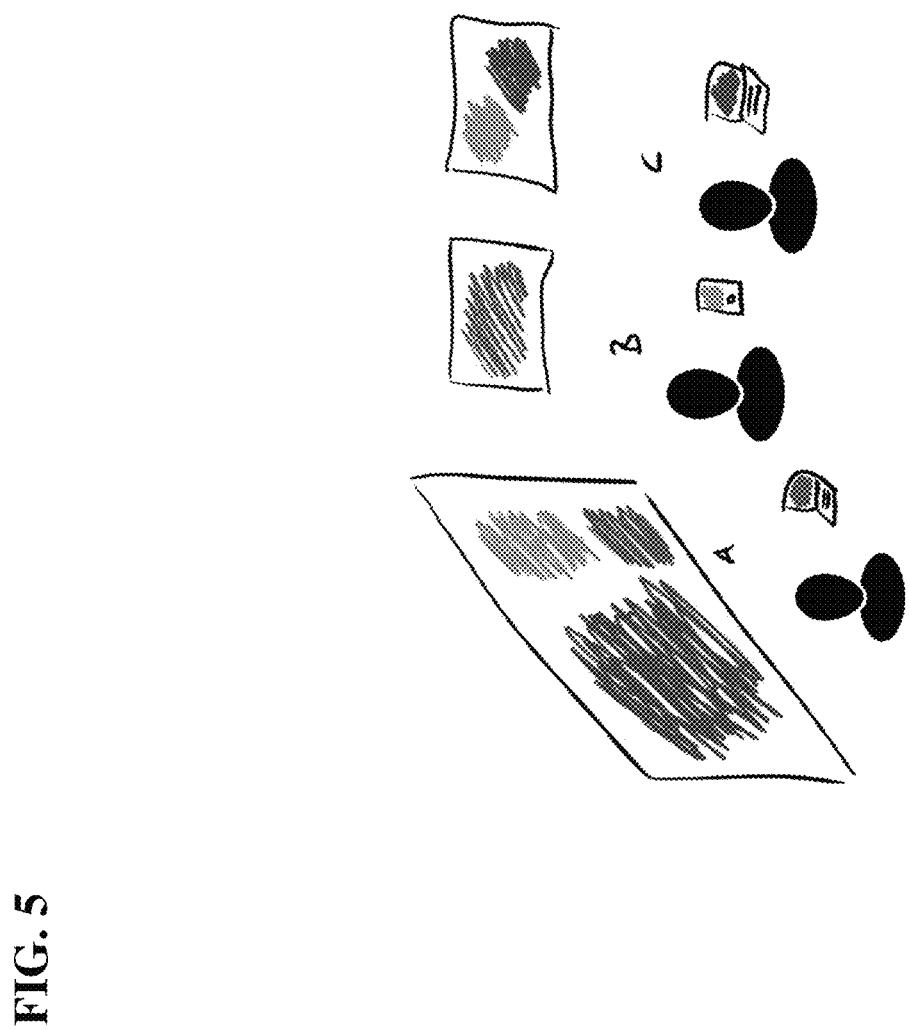
FIG. 5 depicts a group interaction scenario, in accordance with an aspect of the invention.

Meeting Room:

FIG. 5 depicts a group interaction with associated pixel flow/display outcomes in accordance with an aspect of the invention. In a meeting room scenario, several people meet to discuss some topic. The meeting room includes several displays to present information to people present in the room. Users A, B, and C form a temporary group for this meeting. All meeting room displays are shared by the meeting room administration with user A, as she is the designated moderator. All users share their content with the group. Every user can now project all group shared content onto all available displays to them. For users B and C this means their own devices they brought with them, e.g., as picture-in-picture. User A can also project content of B and C onto the meeting room displays and control what is shown at which location.

Figure 6:
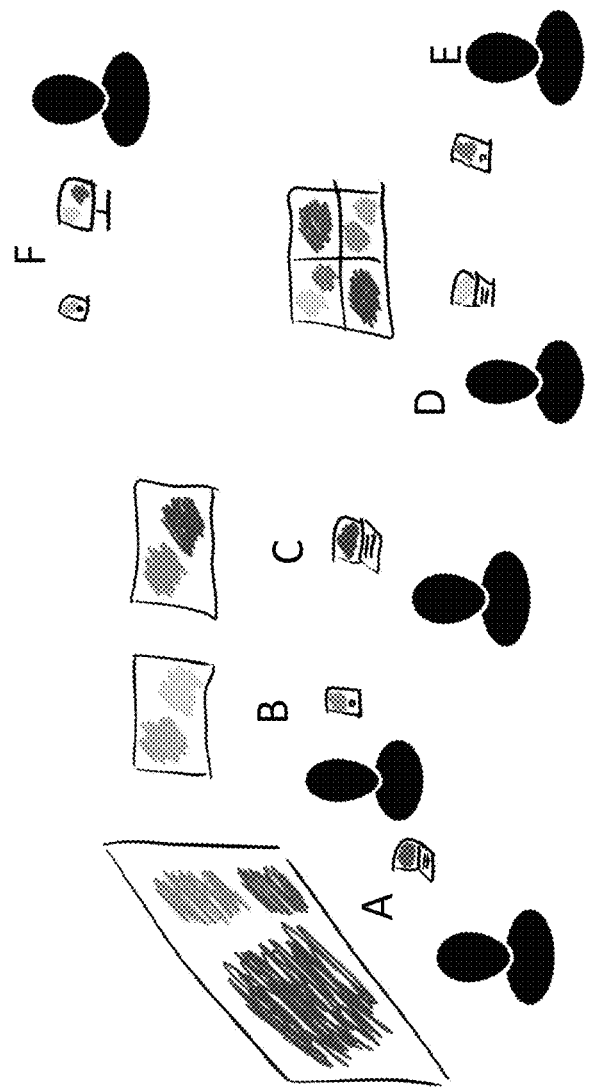
FIG. 6 depicts a group interaction scenario, in accordance with an aspect of the invention.

Remote Meeting:

FIG. 6 depicts a group interaction with associated pixel flow/display outcomes in accordance with an aspect of the invention. The remote meeting scenario is an extended version of the Meeting Room scenario. Here additional participants at two remote locations are invited to join the same group. All participants share their content with this spontaneous group. Displays are not shared with everyone but are just available to one of the persons at each location. User F is in his office and can view content from other locations on his display while also making the content of his mobile device available to both remote locations. Users D and E are in a different meeting room with a display wall and are also able view any remote content as well as share their local devices with remote users.

Figure 7:
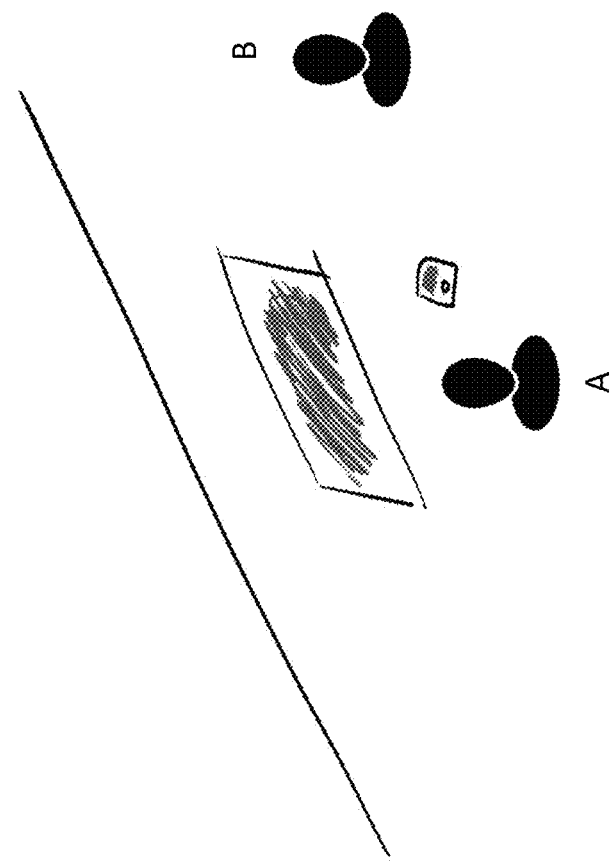
FIG. 7 depicts a group interaction scenario, in accordance with an aspect of the invention.

Local Collaboration:

FIG. 7 depicts a group interaction with associated pixel flow/display outcomes in accordance with an aspect of the invention. In the local collaboration scenario, Users A and B spontaneously meet up at an available public display. The display is shared with both users so both can show their content on it. As no content is shared with the other user, they cannot see each other's content on their own devices.

Figure 8:
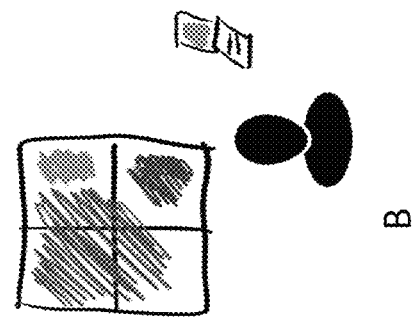
FIG. 8 depicts a group interaction scenario, in accordance with an aspect of the invention.
Figure 8:
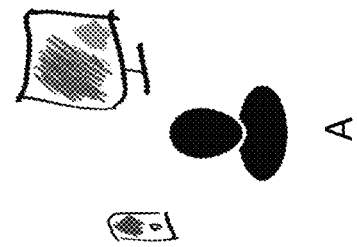

Remote Collaboration:

FIG. 8 depicts a group interaction with associated pixel flow/display outcomes in accordance with an aspect of the invention. In the remote collaboration scenario, two users A and B at different locations need to work on the same problem. Both share their content with each other and therefore can project the content onto their respective displays.

Figure 9:
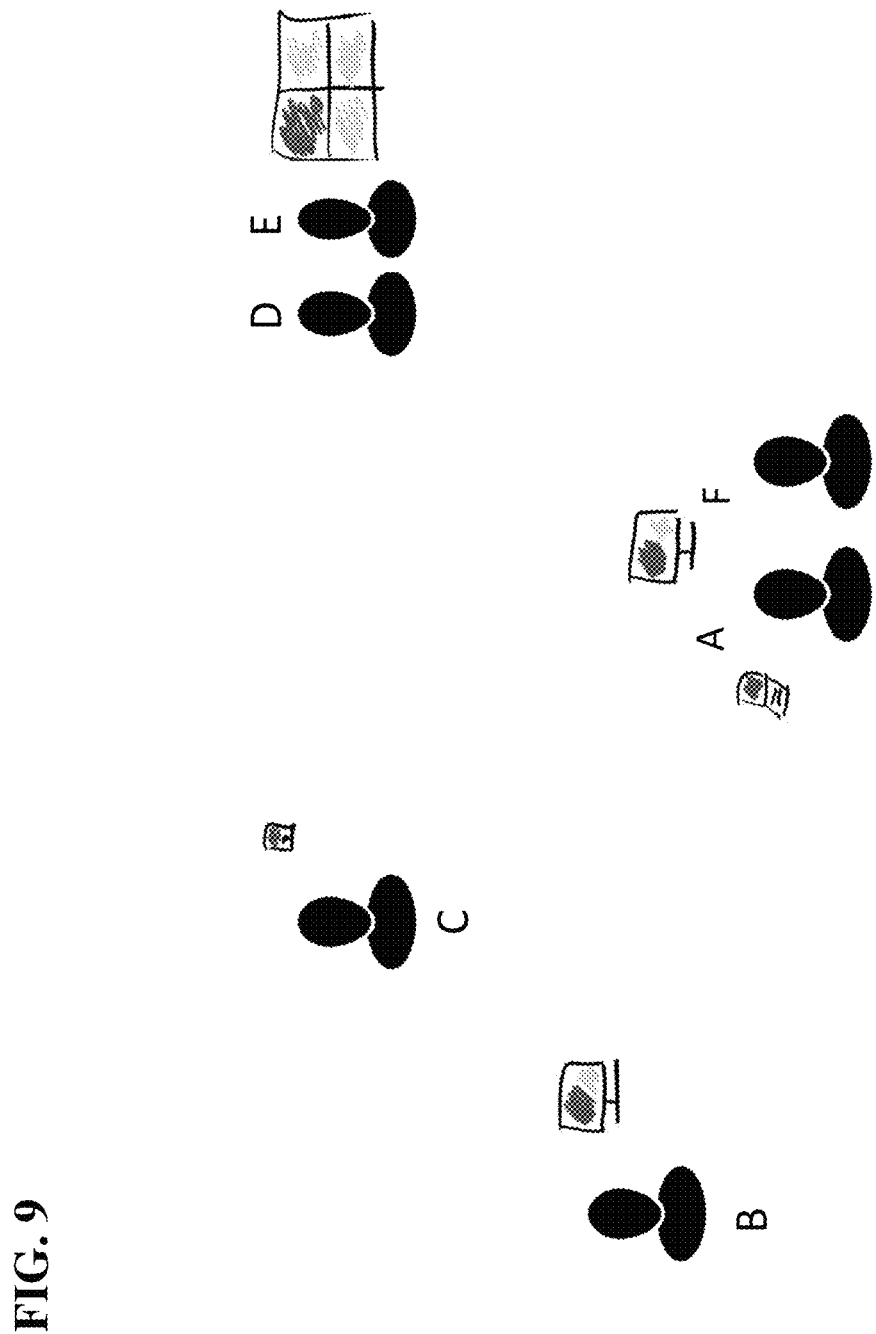
FIG. 9 depicts a group interaction scenario, in accordance with an aspect of the invention.

Information Sharing:

FIG. 9 depicts a group interaction with associated pixel flow/display outcomes in accordance with an aspect of the invention. In the information sharing scenario, user A may want to show his content to different users at different places. A shares his content with the desired users, who in turn decide for themselves where they project A's content.

Figure 10:
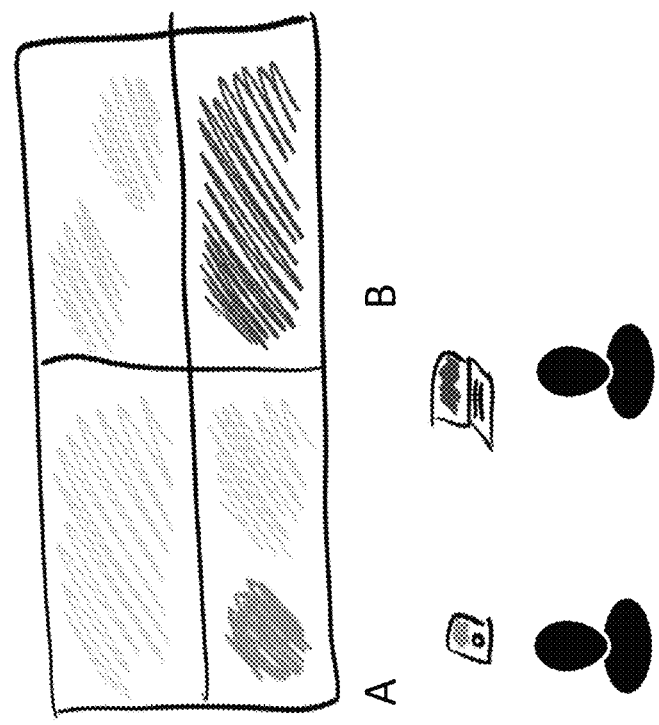
FIG. 10 depicts a group interaction scenario, in accordance with an aspect of the invention.

Customer Interaction:

FIG. 10 depicts a group interaction with associated pixel flow/display outcomes in accordance with an aspect of the invention. In a customer interaction scenario, a display wall in a showroom (e.g., at a car dealer) is showing pre-defined content. Customer A is interested in information about a specific product. Salesperson B has access to the display wall and can show the requested information from his laptop on it. Customer A wants to compare this and a picture of his old product directly. Salesperson B allows A to show his picture on the display wall in a specified area.

Figure 11:
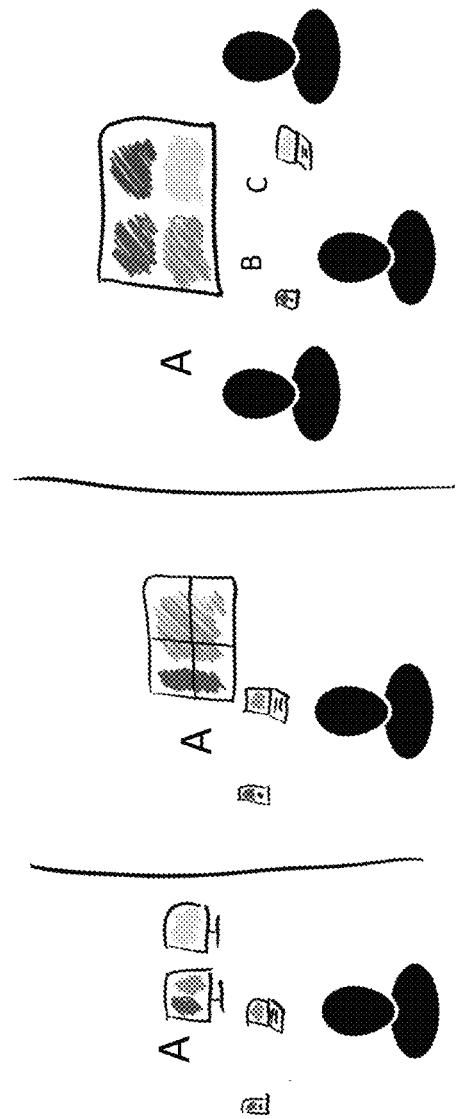
FIG. 11 depicts a group interaction scenario, in accordance with an aspect of the invention.

Context-Aware Sessions:

FIG. 11 depicts a group interaction with associated pixel flow/display outcomes in accordance with an aspect of the invention. User A often uses his mobile and laptop together on whichever displays are available. The system can help the user by automatically projecting both sources depending on the available display space. This can also be stored in a pre-defined session by the user, e.g., as his project workspace. User A can then actively use this session in a completely different situation, e.g. in a meeting. Other users already use some display space, so those are taken into account when projecting. The user does not need to bring his devices with him, as the system knows "project workspace" contains both his mobile and laptop and as long as they are reachable via network they can be projected in the meeting anyways.

Figure 12:
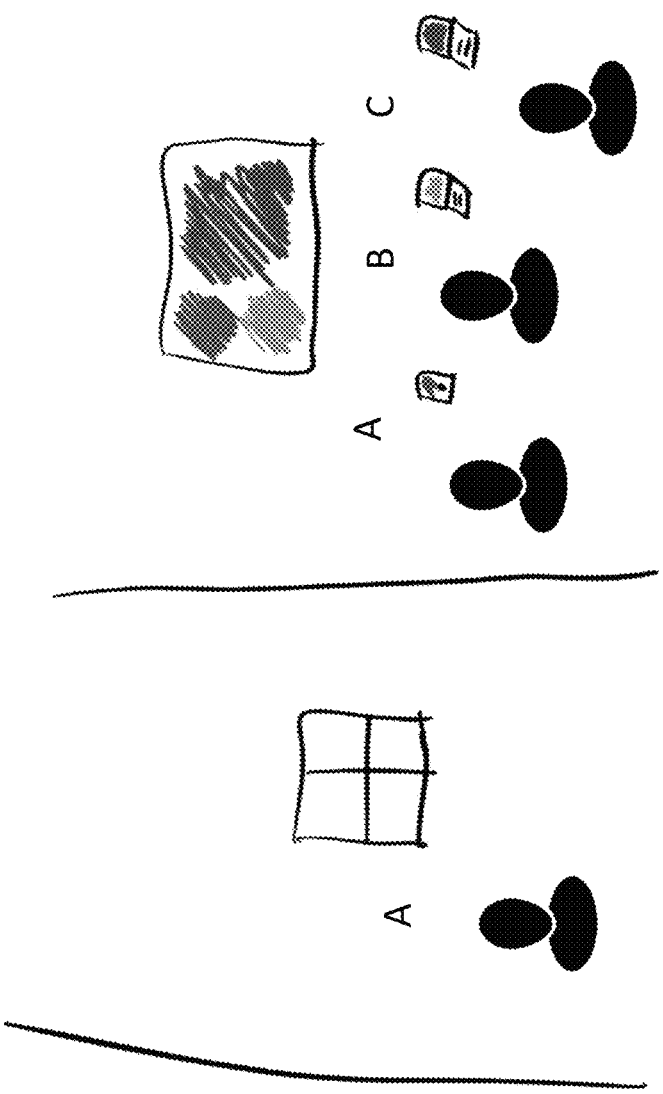
FIG. 12 depicts a group interaction scenario, in accordance with an aspect of the invention.

Time Correlation:

FIG. 12 depicts a group interaction with associated pixel flow/display outcomes in accordance with an aspect of the invention. User A starts a display and a source endpoint shortly after each other. The system detects this time correlation and automatically projects the source onto the display. User A starts multiple displays shortly after each other. The system detects this and automatically offers the user to combine those displays into a wall. If they have the same physical size the system might also automatically propose a grid layout. If multiple users start sources in a scheduled meeting all their sources can be automatically added onto a large display. User C arrived first, so his content initially takes up all space, while A and B are added smaller at the side when they arrive.

Further yet, these applications lack a dynamically reconfigurable user interface-capable of contextual-based: user or group-specific suggestions of spaces/layers, workflow or automation tool add-ons, management of display sharing schemes. In other words, the existing on-line/on-site meeting applications are not capable of being an elastic, thin application, yet capable of multi-dimensional provisioning with machine learning and on-demand reconfigurability. None of them feature a user interface capable of reconfiguring dynamically and allow users with a full spectrum of independent input functionality across any number of virtual spaces and any number of tool layers—to interact with any number of users. Finally, the current solutions are not scalable to respond to the realities and growing demand of remote or on-site group work.

Additional limitations in the art include a lack of standards and interoperable technologies. Novel programming, content-delivery, and network management approaches are also very much needed to process the growing ecosystem of web-enabled objects. Extant architecture found in the art is designed for small-scale, closed-loop networks, which are unable to communicate across these networks in real-time. These access and latency issues effectively impair the execution of the distributed tasks of sensing, computing, and actuating. There exists an essential need for novel software-defined network architectures to effectively and efficiently deliver real-time, contextually based data as one or more of the independent multiple inputs across a multi-dimensional groupware interface. The more inputs; the more contextually aware; and the more informed the system is to react intuitively, regardless of the group interaction scenario.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

In the drawings and specification, there have been disclosed exemplary embodiments of the disclosure. Although specific terms are employed, they are used in a generic and descriptive sense only and not for purposes of limitation, the scope of the invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While this specification contains many specific execution details, these should not be interpreted as limitations on the scope of any inventions or of what may be claimed, but rather as descriptions of features specific to particular embodiments of particular inventions. Certain features that are described in this specification in the context of separate embodiments can also be implemented in combination in a single embodiment. Contrariwise, various features that are described in the context of a single embodiment can also be implemented and interpreted in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For more definition, it is contemplated herein that certain terms are construed broadly, as follows. For example, term "endpoints" may refer generally to "Source endpoints" ("sources") which may be pixel-generating applications available via the infrastructure, "Sink endpoints" ("sinks") which may be pixel-consuming applications available via the infrastructure; note that sources can be projected onto (one or more) sinks to result in a visible pixel flow to the respective sink. Also, term "infrastructure" may refer generally to technical system to distribute pixels via a communication medium (e.g., an Internet Protocol network), whereby such infrastructure may enable using all endpoints without having to connect to it via specific cables, adapters, etc.; further, such infrastructure may provide remote access to all endpoints without requiring direct access to them; note that pixel flow engine may comprise several layers, establish the pixel flow rule governing the pixel flow between logically grouped endpoints based on a respective user interaction. Also, term "user" may refer generally to a natural person owning endpoints within the infrastructure; users are authenticated towards the infrastructure via a user account; virtual users can be used to represent abstract roles or permissions. Also, term "group" may refer generally to a collection of users that share their owned endpoints with each other; no one but the members of the group have access to the endpoints shared with the group; the infrastructure may automatically create "ad-hoc" groups using the system state, user intent, user history, location, the users' calendar appointments or other external triggers; once the reason for a group is gone, the system automatically may remove groups and all associated settings/permissions/data. Also, terms "ownership" and "sharing" may refer generally such that every endpoint is "owned" by a user, i.e., as a default, is configurable and accessible by that user only, typically running on hardware by the user as well; for endpoints not clearly associated with a user (e.g., infrastructure endpoints like lobby displays), the infrastructure can create system users; each user has full access to all endpoints she owns through the infrastructure, meaning she can freely "project" any owned source onto any owned display; endpoints can be "shared" with other users (forming new, ad-hoc groups) or pre-existing groups; sharing with a team makes the entity available to all current users in that team and future users that are added during the sharing period; having access to a shared endpoint (both sources and sinks) enables users of the group shared into to operate on the respective endpoint as if it was owned by the user herself. Also, term "permissions" may refer generally such that users can grant others specific permissions on their owned entities, e.g., remote interaction, share with others, etc.; entities can be shared with limited permissions, e.g., only limited areas of a display; permissions may be cryptographically secured. Also, terms "abstraction/context" may refer generally such that users interact with other users, never with the underlying infrastructure; infrastructure can deduce desired user interactions from context, e.g., which devices are currently used; interactions affecting the system can be triggered by external mechanisms, e.g., a third-party voice-controlled service; interactions can be formulated using natural language, e.g., "show my presentation to Alice" or "share this screen with Bob."

Thus, generally it is contemplated herein that various embodiments may be be enabled according to inventive methods and systems as detailed above. For example, a pixel transporting system includes at least one sender device, at least one receiver device, wherein the sender device and receiver device are coupled and configured by the pixel transport system to process a signal from a sender device and transport the processed signal from the sender device to the receiver device, wherein processing of the signal comprises rendering a partial subset or complete set of source pixels based on a mapping of a virtual projection from a source endpoint to a sink endpoint. Optionally, virtual projection is only partially mapped onto the sink and results in only the intersecting subset of source pixels for transport to the sender device. Also optionally, the virtual projection is completely mapped onto the sink and results in a complete set of source pixels for transport to the sender device. Also optionally, the system further includes a pixel flow engine, wherein said engine is further comprised of a plurality of layers defining a pixel flow rule specifying for each available source pixel how it is transformed and transported to at least one sink endpoint to be displayed. Also optionally, pixel flow rule governs how the source pixel is transported among a logical grouping of endpoints depending on an interaction scenario. Also optionally, interaction scenario includes at least one of an individual, group, or ad-hoc group interactions. Also optionally, display infrastructure system includes at least one sink device, at least one source device, a pixel flow engine, at least one processing unit coupled to a memory element, and having instructions encoded thereon, configured to collect at least one user endpoint data from at least one of a source endpoint or sink endpoint; and trigger an action based on the at least one user endpoint data, wherein the triggered action enables a source endpoint to be projected resulting in pixel transport of only visible pixels to a respective sink endpoint. Also optionally, display infrastructure system configured to collect at least one user endpoint data from at least one of a source endpoint or sink endpoint; and trigger an action based on the at least one user endpoint data, wherein the triggered action enables a source endpoint to be projected resulting in pixel transport of only visible pixels to a respective sink endpoint. Also optionally, display infrastructure system includes at least one sink endpoint, at least one source endpoint, a pixel flow engine having instructions encoded thereon, wherein implemented by a processing unit, configure the system to enable a projection of pixel content at a source endpoint; and only transporting those pixels from the projection to a sink endpoint that intersect with one another. Also optionally, display infrastructure system includes at least one sink device, at least one source device, a pixel flow engine having instructions encoded thereon, wherein implemented by a processing unit, configure the system to enable a projection of pixel content at a source device, only transporting those pixels from the projection to a sink device that intersect with one another, and wherein a pixel flow is direct between the source device and the sink device. Also optionally, display infrastructure system includes at least one sink device, at least one source device, a pixel flow engine having instructions encoded thereon, wherein implemented by a processing unit, configure the system to enable a projection of pixel content at a source device, only transporting those pixels from the projection to a sink device that intersect with one another, wherein a pixel flow is direct between the source device and the sink device; and wherein a global data state of the pixel flow between the source device and the sink device is known. Also optionally, display infrastructure system includes means for collecting at least one user endpoint data from at least one of a source endpoint or sink endpoint, and means for triggering an action based on the at least one user endpoint data, wherein the triggered action enables a source endpoint to be projected resulting in pixel transport of only visible pixels to a respective sink endpoint. Also optionally, display infrastructure system, includes at least one sink endpoint, at least one source endpoint, a pixel flow engine, wherein the system further comprises means for enabling a projection of pixel content at a source endpoint; and means for only transporting those pixels from the projection to a sink endpoint that intersect with one another. Also optionally, display infrastructure system includes at least one sink device, at least one source device, a pixel flow engine, wherein the system further comprises means for enabling a projection of pixel content at a source device, means for transporting those pixels from the projection to a sink device that intersect with one another, means for flowing pixels directly between the source device and the sink device with no intermediary endpoint. Also optionally, display infrastructure system, includes at least one sink device, at least one source device, a pixel flow engine, wherein the system further comprises means for enabling a projection of pixel content at a source device, means for transporting those pixels from the projection to a sink device that intersect with one another, means for flowing pixels directly between the source device and the sink device, with no intermediary endpoint, and means for determining a global data state of the pixel flow between the source device and the sink device is known. Also optionally, the projection to be physically mapped onto a sink endpoint only partially intersects with the sink endpoint and only transports those pixels that intersect, resulting in a direct pixel flow from source to sink of only those pixels that are visible. Also optionally, the projection to be physically mapped onto a sink endpoint fully intersects with the sink endpoint and transports the entire set of source pixels. Also optionally, display infrastructure system includes at least one sink device, at least one source device, a pixel flow engine, wherein the pixel flow engine further comprises a user layer, administrative layer, application layer, and protocol layer interact to inform a pixel flow rule, said pixel flow rule in turn governs a flow of pixels and characteristics of pixel flow between logically grouped endpoints derived from any number of individual, group, and, or ad-hoc group interactions. Also optionally, display infrastructure system includes a pixel source, a pixel sink, a pixel flow engine, at least one processor; a non-transitory storage element coupled to the at least one processor; encoded instructions stored in the non-transitory storage element, wherein the encoded instructions when implemented by the processor, configure the system to receive data for at least one of a pixel source, sink device to inform a pixel flow rule, said pixel flow rule causing any one of, or combination of, control-synchronization, coordination, and, or calibration—of pixel source based on the received data; and transport the controlled pixel source to an available individual display and, or display wall for at least one of viewing, sharing, and, or interacting with in an individual, group, or ad-hoc group scenario, resulting in a direct pixel flow from source to sink of only those pixels that are visible, and furthermore, a global data state of the pixel flow from a source end-point to a sink end-point is known. Also optionally, pixels always flow peer-to-peer, wherein each participating one-to-one stream is treated and optimized separately. Also optionally, pixel flow rules specify for each available source pixel in the infrastructure how it is transformed and transported to specified destinations to be displayed. Also optionally, group interactions is at least one of a group collaborating, remote group collaborating, spontaneous collaboration, information sharing, customer interaction, and, or context-aware session. Also optionally, display infrastructure system includes at least one sink endpoint, at least one source endpoint, a pixel flow engine further comprising at least one of an administrative layer, protocol layer, and application layer that interact to generate a pixel flow rule, wherein the system is configured to obtain data from the sink endpoint, source endpoint and pixel flow rule to generate a permission check on the administrative layer to connect endpoints for pixel flow, whereby if permission is granted, endpoints are connected via the protocol layer to enable the direct flow of pixels from a source endpoint to a sink endpoint via the application layer, and wherein the flow of pixels is rendered as a partial subset or complete set of source pixels based on a mapping of a virtual projection from a source endpoint to a sink endpoint, resulting in a direct flow of only visible pixels from a source endpoint to a permission-granted and connected sink endpoint. Also optionally, further comprising a user layer provides access to the infrastructure for all end users via a set of user interfaces and monitor the infrastructure for certain conditions to trigger corresponding actions. Also optionally, further comprising a user interface includes at least one of a specialized graphical interface for certain purposes, a gesture-based, or a voice-controlled interaction based on a current context. Also optionally, administrative layer uses a controller component of the protocol layer to enforce permissions and define and control all logical end-points and, or logical groups. Also optionally, logical groups can be built from either end-points or users as groups for sharing purposes. Also optionally, logical end-point and, or logical groups are combined to form a multitude of end-points into a higher-level display concept by the administrative layer. Also optionally, higher-level display concept is at least one of a display wall consisting of multiple pixel sinks or a visualization center consisting of multiple separate displays, display walls and sources. Also optionally, application layer transforms input or output pixels written into a pixel source and, or displayed at a pixel sink based on pixel source, pixel sink characteristics, logical end-point characteristics and, or logical grouping characteristic. Also optionally, protocol layer establishes and controls all communication channels between endpoints. Also optionally, protocol layer specifies how all end-points connect; gathers information about all end-points; and reports that information to a controller component. Also optionally, method for governing pixel flow in a display infrastructure includes enabling a projection of pixel content at a source device; transporting those pixels from the projection to a sink device that intersect with one another; flowing pixels directly between the source device and the sink device, with no intermediary endpoint; and determining a global data state of the pixel flow between the source device and the sink device is known. Also optionally, method for governing pixel flow in a display infrastructure includes enabling a projection of pixel content at a source device by a pixel flow engine and, or the source device, transporting those pixels from the projection to a sink device that intersect with one another by the pixel flow engine and, or the sink device; flowing pixels directly between the source device and the sink device, with no intermediary endpoint; and determining a global data state of the pixel flow between the source device and the sink device is known. Also optionally, method for governing pixel flow in a display infrastructure includes informing a pixel flow rule based on an interaction between any one of a user layer, administrative layer, application layer, and, or protocol layer; and governing a flow of pixels and characteristics of pixel flow between logically grouped endpoints derived from any number of individual, group, and, or ad-hoc group interactions based on the informed pixel flow rule. Also optionally, method for an efficient and direct flow of pixels between permission-granted and connected source endpoints and sink endpoints includes obtaining data from the sink endpoint, source endpoint and pixel flow rule to generate a permission check on the administrative layer to connect endpoints for pixel flow, whereby if permission is granted, endpoints are connected via the protocol layer to enable the direct flow of pixels from a source endpoint to a sink endpoint via the application layer; and transporting pixels rendered as a partial subset or complete set of source pixels based on a mapping of a virtual projection from a source endpoint to a sink endpoint, resulting in a direct flow of only visible pixels from a source endpoint to a permission-granted and connected sink endpoint.

Furthermore, it is contemplated herein generally among other things related to various aspects of the present inventive system and method that such inventive aspects may apply in one or more embodiments implemented in a single or multiple computing and/or processing machine and/or network thereof, for example, wherein various automated steps, algorithmic methods, transactional processes, and/or other signal communication, control and/or electronic, quantum and/or optical data processing may be embodied in one or more integrated circuits, state machines, computational modules, processing servers, wired and/or wireless communication interfaces, field-programmable reconfigurable circuits or chips, digital signal processors, as well as functionally equivalent software, firmware, etc. For example, it is further contemplated herein generally that direct and discriminate pixel flow between logically-grouped source to sink based on an interaction may be embodied or otherwise implemented in one or more industry compatible communications platform or transmission/reception interface protocol, as configured automatically in one or more hardware, firmware, or software constructs.

We claim:

1. A display infrastructure system comprising:
    at least one sink endpoint;
    at least one source endpoint;
    a pixel flow engine further comprising at least one of an administrative layer, protocol layer, and application layer that interact to generate a pixel flow rule;
    a processor;
    a non-transitory storage element coupled to the processor over a network;
    encoded instructions;
    wherein the display infrastructure system is configured to:
    obtain data from the sink endpoint, source endpoint and pixel flow rule to generate a permission check on the administrative layer to connect endpoints for pixel flow, whereby if permission is granted, endpoints are connected via the protocol layer to enable the direct flow of pixels from a source endpoint to a sink endpoint via the application layer; and
    wherein the flow of pixels is rendered as a partial subset or complete set of source pixels based on a mapping of a virtual projection from a source endpoint to a sink endpoint, resulting in a direct flow of only visible pixels from a source endpoint to a permission-granted and connected sink endpoint.

2. The display infrastructure system of claim 1, further comprising a user layer provides access to a infrastructure for all end users via a set of user interfaces and monitor the infrastructure for certain conditions to trigger corresponding actions.

3. The display infrastructure system of claim 1, further comprising a user interface includes at least one of a specialized graphical interface for certain purposes, a gesture-based, or a voice-controlled interaction based on a current context.

4. The display infrastructure system of claim 1, wherein the administrative layer uses a controller component of the protocol layer to enforce permissions and define and control at least one of logical endpoints and logical groups.

5. The display infrastructure system of claim 4, wherein the logical groups can be built from either endpoints or users as groups for sharing purposes.

6. The display infrastructure system of claim 4, wherein the logical groups include at least one of an individual, group, or ad-hoc group interactions, and wherein further, the group or ad-hoc group interactions further comprise at least one of a group collaborating, remote group collaborating, spontaneous collaboration, information sharing, customer interaction, and a context-aware session.

7. The display infrastructure system of claim 4, wherein at least one of the logical endpoint and logical groups are combined to form a multitude of endpoints into a higher-level display concept by the administrative layer.

8. The display infrastructure system of claim 7, wherein the higher-level display concept is at least one of a display wall comprising of multiple pixel sinks and a visualization center comprising of multiple separate displays, display walls and sources.

9. The display infrastructure system of claim 1, wherein the application layer transforms input or output pixels written into a pixel source and displayed at a pixel sink based on at least one of a pixel source, pixel sink characteristic, logical endpoint characteristic and a logical grouping characteristic.

10. The display infrastructure system of claim 1, wherein the protocol layer establishes and controls all communication channels between endpoints.

11. The display infrastructure system of claim 10, wherein the protocol layer specifies how all endpoints connect; gathers information about all endpoints; and reports that information to a controller component.

12. The display infrastructure system of claim 1, wherein the flow of pixels is directly between the source endpoint and the sink endpoint, with no intermediary endpoint, and a global data state of the flow of pixels between the source endpoint and the sink endpoint is known.

13. A pixel transporting system, said pixel transporting system comprising:
    at least one sender device as a source endpoint;
    at least one receiver device as a sink endpoint;
    a pixel flow engine, wherein said pixel flow engine is further comprised of a plurality of layers defining a pixel flow rule specifying for each available source pixel how it is transformed and transported to at least one sink endpoint to be displayed;
    wherein the sender device and receiver device are coupled and configured by the pixel transport system to: process a signal from a sender device and transport the processed signal from the sender device to the receiver device, wherein processing of the signal comprises rendering a partial subset or complete set of source pixels based on a mapping of a virtual projection from a source endpoint to a sink endpoint.

14. The pixel transporting system of claim 13, wherein a virtual projection to be physically mapped onto a sink endpoint only partially intersects with the sink endpoint and only transports those pixels that intersect, resulting in a direct pixel flow from source to sink of only those pixels that are visible.

15. The pixel transporting system of claim 13, wherein the virtual projection is completely mapped onto the sink and results in a complete set of source pixels for transport to the sender device.

16. The pixel transporting system of claim 13, wherein the pixel flow rule governs how the source pixel is transported among a logical grouping of endpoints depending on an interaction scenario.

17. The pixel transporting system of claim 16, wherein the interaction scenario includes at least one of an individual, group, or ad-hoc group interactions, and wherein further, the group or ad-hoc group interactions further comprise at least one of a group collaborating, remote group collaborating, spontaneous collaboration, information sharing, customer interaction, and a context-aware session.

18. The display infrastructure system of claim 11, wherein the pixel flow is directly between the source device and the sink device, with no intermediary endpoint, and a global data state of the pixel flow between the source device and the sink device is known.

19. A method for governing pixel flow in a display infrastructure, said method comprising the steps of:
obtaining data from a sink endpoint, source endpoint and pixel flow rule to generate a permission check to connect endpoints for pixel flow, whereby if permission is granted, endpoints are connected to enable the direct flow of pixels from a source endpoint to a sink endpoint;
rendering the flow of pixels as a partial subset or complete set of source pixels based on a mapping of a virtual projection from a source endpoint to a sink endpoint, resulting in a direct flow of only visible pixels from a source endpoint to a permission-granted and connected sink endpoint; and
governing how the source pixel is transported among a logical grouping of endpoints depending on an interaction scenario, wherein the interaction scenario includes at least one of an individual, group, or ad-hoc group interactions, and wherein further, the group or ad-hoc group interactions further comprise at least one of a group collaborating, remote group collaborating, spontaneous collaboration, information sharing, customer interaction, and a context-aware session.

20. A method for pixel transporting comprising the steps of:
obtaining data from a receiver device, a sender device and pixel flow rule to generate a permission check to connect endpoints for pixel flow, whereby if permission is granted, endpoints are connected to render the direct flow of pixels from a source endpoint to a sink endpoint;
coupling and configuring at least one sender device and one receiver device to process a signal from a sender device and transport the processed signal from the sender device to the receiver device, wherein processing of the signal comprises rendering a partial subset or complete set of source pixels based on a mapping of a virtual projection from a source endpoint to a sink endpoint.

21. A pixel transporting system, said pixel transporting system comprising:
at least one sender device as a source endpoint;
at least one receiver device as a sink endpoint;
wherein the sender device and the receiver device are coupled and configured by the pixel transport system to: process a signal from a sender device and transport the processed signal from the sender device to the receiver device, wherein processing of the signal comprises rendering a partial subset or complete set of source pixels based on a mapping of a virtual projection from a source endpoint to a sink endpoint; and
wherein the virtual projection to be physically mapped onto a sink endpoint only partially intersects with the sink endpoint and only transports those pixels that intersect, resulting in a direct pixel flow from source to sink of only those pixels that are visible.

* * * * *